Patented Apr. 6, 1943

2,315,537

UNITED STATES PATENT OFFICE 2,315,537

BENZACRIDONYL ANTHRAQUINONE DYESTUFF

Alfred Miller, Orchard Park, N. Y., assignor to Allied Chemical & Dye Corporation, a corporation of New York No Drawing. Application December 2, 1938, Serial No. 243,521

11 Claims. (Cl. 260—276)

This invention relates to novel organic compounds of the 1,2-benzacridonyl-anthraquinone type. It relates particularly to new ring closed condensation products of benzacridonyl trianthrimide which are vat dyestuffs dyeing novel brown shades.

The benzacridonyl trianthrimide compounds are of the following general formula

I 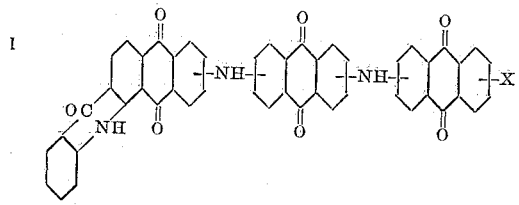

in which the two anthrimide imino (—NH—) groups are attached to alpha carbon atoms of the anthraquinone nuclei, and X is either hydrogen or an acylamino group and is also attached to an alpha carbon atom. Preferably the anthraquinone nuclei are otherwise unsubstituted. As is evident from above Formula I, no two of the imino groups shown in the formula and the acylamino group represented by X are attached to the same benzene ring of an anthraquinone nucleus.

The benzacridonyl trianthrimides can be prepared by a number of different methods which are summarized as follows:

One molecular proportion of 1-aminoanthraquinone is condensed with one molecular proportion of 1,5-dichloranthraquinone to form 5-chlor-1,1'-dianthrimide. A molecular proportion of the latter is then condensed with one molecular proportion of 1,2-benzacridonyl-5-aminoanthraquinone to form the benzacridonyl trianthrimide represented by the formula:

II 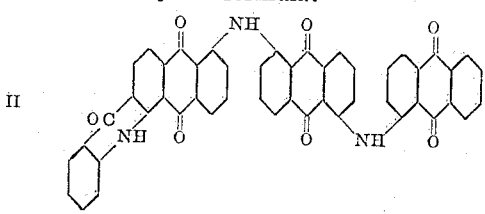

If 1,5-dichloranthraquinone used above is replaced by 1,8-dichloranthraquinone, the benzacridonyl trianthrimide formed may be represent by the formula:

III 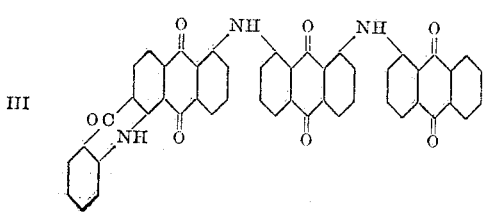

If in the above methods the 1,2-benzacridonyl-5-aminoanthraquinone is replaced by 1,2-benzacridonyl-8-amino-anthraquinone, the respective compounds obtained may be represented by the following formulae:

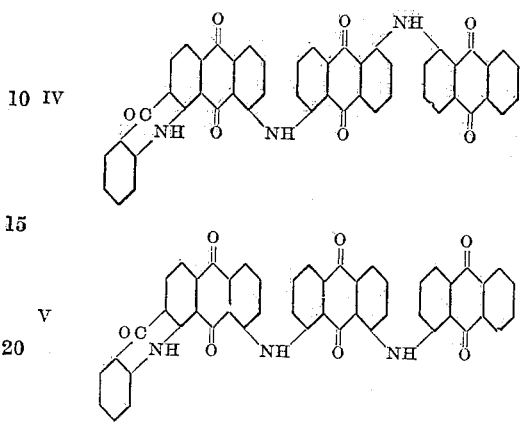

The same compounds are obtained if in the above general methods dichloranthraquinone is replaced by dibromanthraquinone. They are also obtained if the 1-halogen-anthraquinone and the 5- or 8-halogenated-1,2-benzacridonyl-anthraquinone are reacted with 1,5- or 1,8-diaminoanthraquinone; that is to say, if in the reactant organic compounds of the above methods, the halogen and amino substituents are interchanged.

Mixtures of such benzacridonyl trianthrimides result from the use of a mixture of 1,2-benzacridonyl-5 and 8-aminoanthraquinones and/or a mixture of 1,5- and 1,8-dihalogenated anthraquinones.

The foregoing benzacridonyl trianthrimides, which are the subject of my copending application Serial No. 434,377 filed March 12, 1942, when ground yield brown violet to Bordeaux-brown powders which are sparingly soluble in nitrobenzene but dissolve readily in concentrated sulfuric acid to form yellow-brown to orange brown to reddish brown solutions which, on dilution with water, precipitates the compounds as violet-red to red-violet flocks.

The vat dyestuffs of the present invention are obtained when the foregoing benzacridonyl trianthrimides are condensed by the action of acidic ring closing condensing agents; such as anhydrous aluminum chloride, ferric chloride, zinc chloride, etc. The chemical constitution of these condensation products is not certainly known. While it is believed they are probably carbazols formed by joining of the two beta-carbon atoms next to an imino bridge to form the carbazol ring, the invention is not limited to any theoretical explanation.

The following examples, in which parts are by weight and temperatures are in degrees centigrade, illustrate the invention:

*Example 1.*—A mixture of 83 parts of 1,5-dichloranthraquinone, 67 parts of 1-aminoanthraquinone, 2000 parts of nitrobenzene, 100 parts of soda ash, and 10 parts of copper carbonate is raised to a temperature of 200° to 210° while thoroughly agitated. It is maintained at that temperature for 2 to 3 hours then after it is allowed to cool to about 180°, 102 parts of 1,2-benzacridonyl - 5 - aminoanthraquinone are added thereto, and the mixture is heated to 204° to 210°, where it is maintained for about 12 hours. The mixture is then cooled, and steam-distilled to remove nitrobenzene therefrom. The resulting slurry is filtered; the filter-cake is washed with hot water until it is free from alkali, and finally it is dried at 100° to 110°.

The final product is 1,2-benzacridonyl-5,5', 1',1''-trianthrimide. When ground, for example to pass through a 60 mesh screen, it is a dark-brown violet powder which dissolves in concentrated sulfuric acid to form an orange-brown solution. The latter when diluted with water deposits the product as red-violet flocks.

The foregoing reaction can be illustrated by the following formulae:

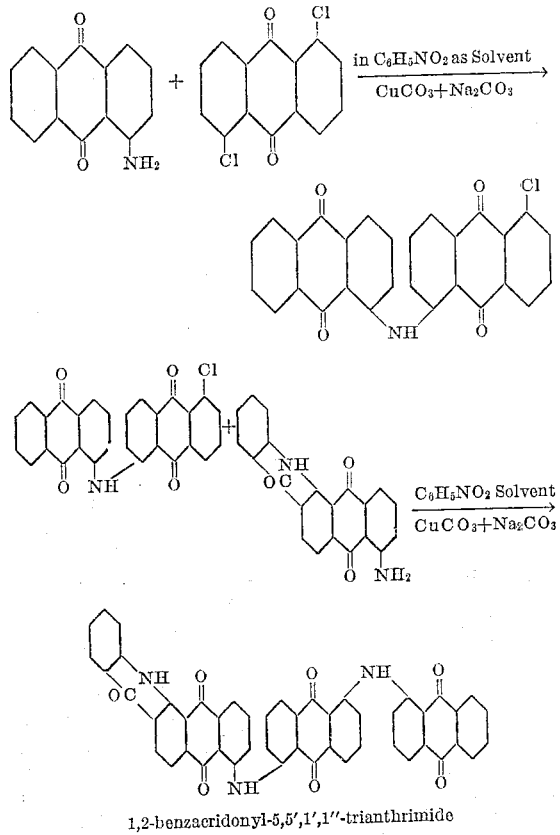

1,2-benzacridonyl-5,5',1',1''-trianthrimide

*Example 2.*—A mixture of 1 part of common salt and 5 parts of anhydrous aluminum chloride is fused by heating to between 120° and 130° and is thoroughly agitated while 1 part of 1,2-benzacridonyl-5,5', 1',1''-trianthrimide (see Example 1) is gradually added thereto. The resulting melt is heated to between 155° and 165° and is maintained there for half an hour. The mass is then transferred into 50 to 100 parts of water; the resulting slurry is boiled and filtered; the filter cake of product, suspended in about 60 parts of about 3% aqueous sulfuric acid, is again boiled; the acid slurry is filtered and the filter cake is then similarly boiled and separated from a boiling aqueous 5% solution of caustic soda. Finally the filter cake, after being washed with hot water until the washings are neutral, is dried in an oven at about 100°. The dry product when ground yields a dark, almost black powder, which is very sparingly soluble in organic solvents, but dissolves in concentrated sulfuric acid to yield a violet-brown solution which when diluted with water deposits the dyestuff as yellow-brown flocks. From vats, the dyestuff dyes cotton yellowish-brown shades of excellent fastness to washing, light, chlorine.

The ring closing condensation of any of the other 1,2-benzacridonyl trianthrimides herein disclosed, in the form of single compounds or mixtures, can be obtained by following this procedure.

*Example 3.*—A condensation fusion is conducted in the manner described in Example 2, but the final fusion temperature is maintained between 140° and 145° (instead of 155° to 165°). The dyestuff thus obtained dissolves, in concentrated sulfuric acid to form a violet-brown solution, which on dilution with water deposits the color as Bordeaux-red flocks. From vats, the dyestuff dyes cotton reddish-brown shades of excellent fastness to washing, chlorine, and light.

*Example 4.*—1 part of common salt, 5 parts of anhydrous aluminum chloride, and 1 part of 1,2-benzacridonyl - 4'' - benzoylamino-5,1',5',1''-trianthrimide are mixed thoroughly, and maintained between 90° and 100° for two hours. The fusion mass is drowned in water; the slurry is filtered; and the organic filter cake is reslurried with dilute hot aqueous soda solution, again separated by filtration, and washed alkali-free with hot water. The netural cake is dried in air at about 100° and ground. The dry powder is almost black, and dissolves in concentrated sulfuric acid to form a reddish-brown solution which on dilution with water deposits the dyestuff as reddish-brown flocks.

In the foregoing Example 1, if 1,2-benzacridonyl-5-aminoanthraquinone is replaced by an equal amount of 1,2-benzacridonyl-8-aminoanthraquinone, the final product is 1,2-benzacridonyl-8,5', 1',1''-trianthrimide (Formula IV). The 1,5-dichloranthraquinone can be replaced by 1,5-dibromanthraquinone.

If 1,5-dichlor- or dibrom-anthraquinone is replaced by 1,8-dichlor- or dibrom-anthraquinone in the foregoing reactions, the respective products are: 1,2-benzacridonyl-5, or 8, 1',8',1''-trianthrimides (Formulae III and V). Similarly, one can obtain mixtures of 1,2-benzacridonyl trianthrimides by using one or a mixture of the isomeric 1,2-benzacridonyl-5- or 8-aminoanthraquinones with one or a mixture of the 1,5- and 1,8-dihalogenated anthraquinone in the foregoing condensing reaction, as illustrated by the following example.

*Example 5.*—In place of 83 parts of 1,5-dichloranthraquinone employed in Example 1, there is employed the same weight of a mixture of about equal parts of 1,5- and 1,8-dichloranthraquinone, and in place of the 1,2-benzacridonyl-5-aminoanthraquinone employed in Example 1, there is employed 102 parts of 1,2-benzacridonyl-8-aminoanthraquinone, other conditions being the same as in Example 1. There is obtained as the final product a mixture of 1,2-benzacridonyl-8,5', 1',1''-trianthrimide and 1,2-benzacridonyl-8,8', 1',1''-trianthrimide. This mixture when heated for one-half hour with an aluminum chloride-sodium chloride mixture at 140°–145°, as in Example 3, produces a dyestuff which dyes cotton somewhat bluer shades than does the dyestuff obtained in Example 3, and of substantially equal fastness.

In place of 1-aminoanthraquinone there can be used 1-N-acylamino-5-aminoanthraquinone, or 1-N-acylamino-8-aminoanthraquinone in the above described condensations. Thus, instead of the 1-aminoanthraquinone in Example 1, or its variations described above, 1-N-benzoylamino-5-aminoanthraquinone or 1-N-toluyl-5-aminoanthraquinone or the corresponding 1-N-acetylamino-8-aminoanthraquinone compounds may be used. If the middle component is a diaminoanthraquinone, then 1-N-acylamino-5- or 8- halogen anthraquinone compounds may be used to obtain the N-acylamino benzacridonyl trianthrimide.

By fusions similar to those above described, ring closed condensation products can be made from other benzacridonyl trianthrimides which correspond with the following general formula

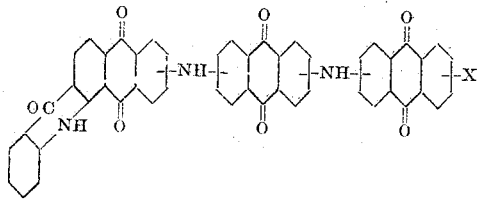

in which the imino groups are attached to alpha positions and X is attached to an alpha position and is hydrogen or acylamino; such as acetylamino, benzoylamino, toluylamino, etc.

The condensation products in such cases are dark powders, soluble in concentrated sulfuric acid to form reddish-brown to Bordeaux-brown solutions, which on dilution with water precipitate typical reddish-brown to yellow-brown flocks. The dyestuffs dye cotton from vats in yellow-brown to red-brown shades which are characterized by excellent fastness to washing, chlorine, and light.

It will be realized by those skilled in the art that the invention is not limited to the details of the above disclosure but that changes can be made without departing from the scope of the invention.

Thus, the dianthrimides employed as intermediate products for the production of the trianthrimides in accordance with the present invention may be produced in other ways than those herein disclosed. Further, while, as above indicated, it is desirable to use substantially equimolecular proportions of the reacting ingredients, it is not essential that the amounts correspond exactly with such proportions. While the condensation of the amino- and halogen-anthraquinone compounds with each other, for the formation of the trianthrimides, is preferably carried out with the aid of sodium carbonate and copper carbonate in the presence of nitrobenzene as a solvent at temperatures ranging, for example, from 190° to 210°, the reaction may be carried out in the presence of other organic solvents at other temperatures, for example, o-nitrotoluene at 190° to 222°, and with the aid of other acid binding agents, such as sodium acetate or magnesium oxide, and other copper salts, for example, copper oxide, copper acetate, etc., as catalysts.

I claim:

1. A brown vat dyestuff which in the form of a powder is a dark almost black powder, very sparingly soluble in organic solvents but dissolving in concentrated sulfuric acid to yield a violet-brown solution which when diluted with water deposits the dyestuff as Bordeaux-red to yellow-brown flocks, dyes cotton from a vat in reddish-brown to yellowish-brown shades of excellent fastness to washing, light, and chlorine, and is obtained by heating a trianthrimide selected from the group consisting of 1,2-benzacridonyl-5,5′,1′,1″-trianthrimide and 1,2-benzacridonyl-8,8′,1′,1″-trianthrimide in the presence of anhydrous aluminum chloride at a final fusion temperature of between about 140° C. and 165° C.

2. The process of making a brown vat dyestuff which comprises heating an anthrimide acridone compound of the following general formula:

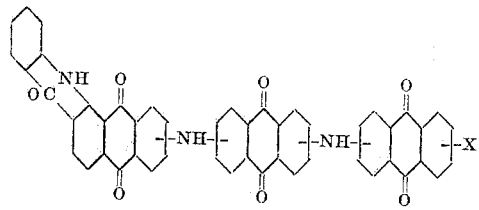

in which the anthrimide imino groups are attached to alpha positions of the anthraquinone nuclei, and X is attached to an alpha position of the anthraquinone nucleus and is selected from the group consisting of hydrogen and acylamino, in the presence of an acidic condensing agent selected from the group consisting of anhydrous aluminum chloride, ferric chloride, and zinc chloride.

3. The process of making a brown vat dyestuff which comprises heating an anthrimide compound of the following general formula:

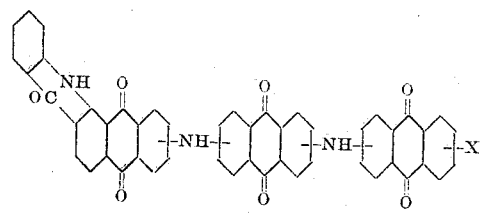

in which the anthrimide imino groups are attached to alpha positions of the anthraquinone nuclei, and X is attached to an alpha position of the anthraquinone nucleus and is selected from the group consisting of hydrogen and acylamino, in the presence of an acidic condensing agent selected from the group consisting of anhydrous aluminum chloride, ferric chloride, and zinc chloride at a final fusion temperature of about 155° C. to about 165° C.

4. The process of making a brown vat dyestuff which comprises heating an anthrimide compound of the following general formula:

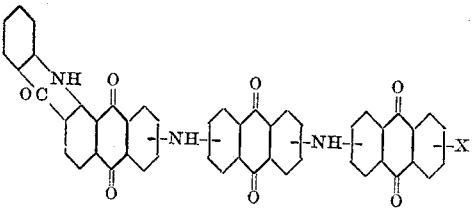

in which the anthrimide imino groups are attached to alpha positions of the anthraquinone nuclei, and X is attached to an alpha position of the anthraquinone nucleus and is selected from the group consisting of hydrogen and acylamino, in the presence of an acidic condensing agent selected from the group consisting of anhydrous aluminum chloride, ferric chloride, and zinc chloride at a final fusion temperature of about 140° C. to about 145° C.

5. The process of making a brown vat dyestuff which comprises heating an anthrimide acridone compound of the following general formula

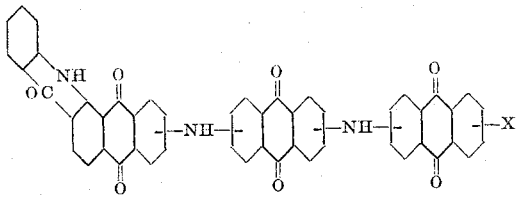

in which the anthrimide imino groups are attached to alpha positions of the anthraquinone nuclei and X is an acylamino group attached to an alpha position of the anthraquinone nucleus, in the presence of an acidic condensing agent selected from the group consisting of anhydrous aluminum chloride, ferric chloride, and zinc chloride at a final fusion temperature of about 90° C. to about 100° C.

6. A vat dyestuff obtained by reacting one molecular proportion of a mixture of about equal weights of 1,5-dichloranthraquinone and 1,8-dichloranthraquinone with about an equi-molecular proportion of 1-aminoanthraquinone, then reacting the resulting product with about an equi-molecular proportion of 1,2-benzacridonyl-8-aminoanthraquinone, and heating the resulting mixture of mono-1,2-benzacridonyl trianthrimides for about one-half hour with an aluminum chloride-sodium chloride mixture at 140° to 145° C.

7. The process of making a brown vat dyestuff which comprises heating a reaction mixture containing anhydrous aluminum chloride and a trianthrimide selected from the group consisting of 1,2-benzacridonyl - 5,5', 1',1''- trianthrimide and 1,2-benzacridonyl-8,8',1',1''-trianthrimide, at a final fusion temperature of between 140° C. and 165° C.

8. The process of making a brown vat dyestuff which comprises heating a reaction mixture containing anhydrous aluminum chloride and a mixture of mono-1,2-benzacridonyl trianthrimides obtained by the interaction of 1,2-benzacridonyl-8-aminoanthraquinone with the reaction product of about one molecular proportion of 1-aminoanthraquinone and one molecular proportion of a mixture of 1,5-dichloranthraquinone and 1,8-dichloranthraquinone, at a final fusion temperature of about 140° C. to about 145° C.

9. The dyestuffs resulting from the fusion of an acidic ring closing condensing agent with an anthrimide acridone compound of the following general formula:

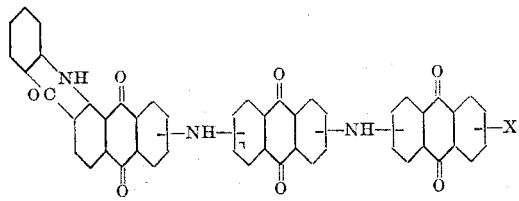

in which the anthrimide imino groups are attached to alpha positions of the anthraquinone nuclei, and X is attached to an alpha position of the anthraquinone nucleus and is selected from the group consisting of hydrogen and acylamino.

10. The dyestuffs resulting from the fusion of an acidic ring closing condensing agent with an anthrimide acridone compound of the following general formula:

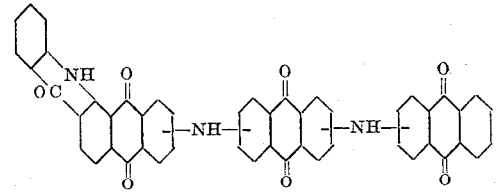

in which the anthrimide imino groups are attached to alpha positions of the anthraquinone nuclei.

11. The brown vat dyestuff resulting from the process of claim 8.

ALFRED MILLER.